Sept. 12, 1939.     C. W. ANDREWS     2,173,060
FILTERING APPARATUS
Filed May 3, 1937
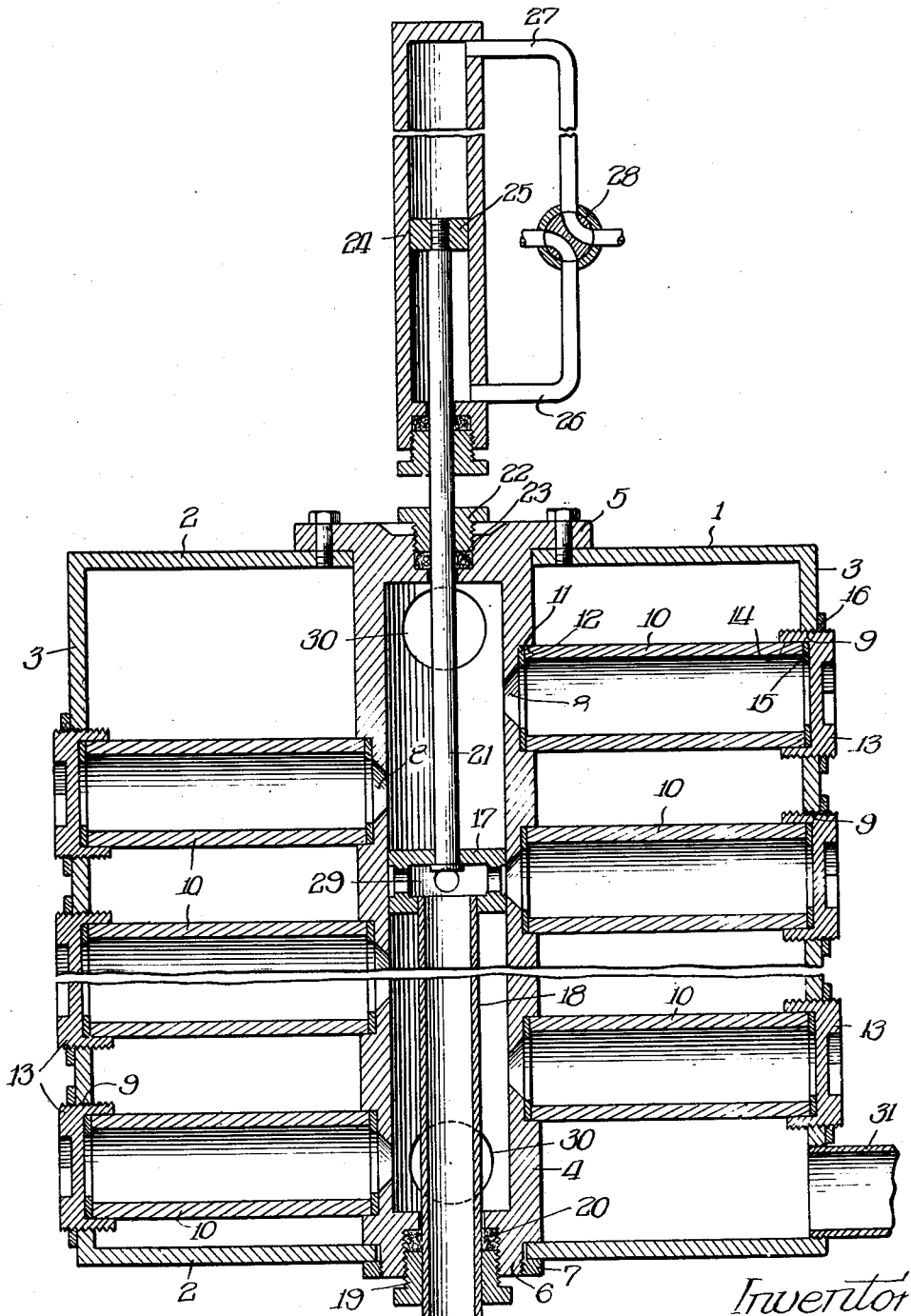

Patented Sept. 12, 1939

2,173,060

UNITED STATES PATENT OFFICE 2,173,060

FILTERING APPARATUS

Charles W. Andrews, Chicago, Ill., assignor to H. A. Brassert & Company, Chicago, Ill., a corporation of Illinois Application May 3, 1937, Serial No. 140,322

6 Claims. (Cl. 210—167)

The present invention relates to filtering apparatus.

More particularly the present invention relates to filtering apparatus capable of backwashing for removing residue collected from the fluid being filtered, which backwashing may be accomplished without taking the filtering apparatus out of service. Means for accomplishing this purpose have previously been suggested and have been put into service, but those with which applicant is familiar are open to serious objections. For example, many of the commercial filters involve the rotation of the filtering media past a backwash port. In other words, such prior devices involve a construction in which the sections of the filtering media are successively brought opposite the backwash port for cleaning.

An object of the present invention is to provide an improved filtering apparatus in which backwashing of the various filtering media may be accomplished in a construction in which the number of rubbing surfaces is reduced and accordingly presents fewer and simpler problems in servicing.

A further object is to provide filtering apparatus capable of convenient backwashing, which is relatively cheap in construction and which presents no serious problems in making repairs and replacements.

A further object is to provide improved filtering apparatus capable of backwashing while in service, in which the filtering media are maintained stationary, valve means being provided for successively backwashing the various filtering media in succession.

Further objects will appear as the description proceeds.

The drawing is a sectional view of one embodiment of the present invention.

The numeral 1 indicates a casing having the end walls 2—2 and the side walls 3—3. The cross sectional contour of the casing 1 in a plane transverse to the paper may take any preferred form, as for example a rectangular form or a circular form. In the latter case the walls 3—3 would, of course, be a single cylindrical wall.

The end walls 2—2 are apertured for the reception of a cylinder 4, which may be provided with the head portion 5 adapted to abut against and to be secured in fluid-tight connection with the outer surface of the adjacent end wall 2. The other end of the cylinder 4 is adapted to abut against the inner surface of the opposite end wall 2, said other end having a threaded portion, indicated by the numeral 6, adapted to extend through the corresponding aperture of the adjacent end wall 2. A nut 7 is provided for securing the screw-threaded end of the cylinder 4 in fluid-tight connection with its adjacent end wall 2.

The cylinder 4 is provided with a plurality of apertures 8—8 spaced along the length thereof, said apertures being staggered relative to one another. The side walls 3—3 are provided with apertures 9—9, which may be screw-threaded. Said apertures 9—9 will be disposed in alignment with the apertures 8—8 in planes transverse to the axis of the cylinder 4. Disposed in symmetrical relationship with each pair of apertures 8 and 9 is a filtering member 10. The filtering members 10 may conveniently take the form of cylinders, though other shapes may be used if preferred. The inner end of each cylinder 10 is disposed in abutting relationship with a gasket 11 set into a corresponding recess 12 in the cylinder 4, said gasket 11 and recess 12 being disposed in symmetrical relationship with a corresponding aperture 8 in said cylinder 4. Disposed in holding relationship with the outer end of each filtering member 10 is a cap nut 13 threaded into a corresponding aperture 9. Said cap nut is recessed at its inner end, as indicated by the numeral 14, for receiving the corresponding end of a filtering member 10. A gasket 15 is provided for contact with the adjacent end of the filtering member 10 to provide fluid-tight holding means therefor, and a lock nut 16 is provided for holding each cap nut 13 securely in position.

Disposed within the cylinder 4 is the hollow piston 17 adapted to be reciprocated throughout the length of the bore of said cylinder 4. Said piston 17 is mounted at one end of the hollow piston rod 18, having sliding relationship at one end of the cylinder 4 with the packing gland 19, which in cooperation with the packing 20 provides a fluid-tight joint between the hollow piston rod 18 and the adjacent end of the cylinder 4. The opposite side of the hollow piston 17 is provided with the operating piston rod 21, which through the medium of the packing gland 22 and the packing 23 has fluid-tight bearing relationship with the other end of the cylinder 4. The operating rod 21 may be reciprocated by any preferred means. The particular means chosen for illustration comprises the operating cylinder 24 for receiving said operating rod 21. Said cylinder 24 is provided with the piston 25. Conduits 26 and 27 are provided having communication with the interior of the operating cylinder 24 at the two ends thereof. A four-way valve 28 provides control for fluid pressure to be applied alternately to the two ends of the operating cylinder 24 to cause the reciprocation of the operating rod 21, the hollow piston 17 and the hollow piston rod 18.

The hollow piston 17 has the passageway 29 disposed transversely thereof, said passageway 29 being adapted to connect successively with the apertures 8—8 in the cylinder 4. As indicated above, the apertures 8—8 are staggered relative to one another whereby the number of apertures having communication with the passageway 29 at any one time is limited. According to the illustrated embodiment of the present invention, only one aperture 8 may communicate with the passageway 29 in the hollow piston 17 at any one time.

The numerals 30—30 indicate inlets to the interior of the cylinder 4 at the two extremities thereof. Said inlets 30—30 communicate with a source of fluid to be filtered. The numeral 31 indicates an outlet conduit communicating with the casing 1 for carrying off filtered fluid.

It will be understood, of course, that the filtering members 10, instead of having their axes disposed in a single plane, as indicated in the drawing, may be disposed radially in a plurality of planes about the axis of the cylinder 4. It will be understood further that instead of having a hollow reciprocating piston communicating successively with the various filtering members 10 to carry off the backwash, a continuously rotating member may be provided either in the form of a cylinder or a plate providing communication successively with the interiors of the filtering members 10 and a discharge conduit for backwash.

A mode of operation of the illustrated embodiment of the present invention is substantially as follows: Fluid to be filtered will be admitted under pressure simultaneously to the inlets 30—30. This material will pass outwardly through all of the apertures 8 except that aperture 8 which is covered by the piston 17. Fluid will pass through said apertures 8 through the filtering members 10, and, freed of its residue, will pass out through the outlet conduit 31. The residue filtered out of the material will collect on the inner surface of each of the filtering members 10.

The back pressure through the outlet conduit 31 may be controlled by means of valves (not shown) or other means. As the passageway 29 in the hollow piston rod 17 communicates with the apertures 8—8 in succession, the back pressure in the filtered fluid will cause a backwash through the corresponding filter member 10, washing off the residue from the inner surface of that corresponding filter member, the backwash being discharged through the hollow piston rod 18. The conduit through the hollow piston rod 18 may also be controlled by a valve (not shown) or other means, whereby the backflow of cleaned fluid may be prevented from becoming excessive. In other words, by controlling the back pressures within the outlet conduit 31 and in the hollow piston rod 18, it is possible to control the pressure head to accomplish the proper backwashing. It will be understood, of course, that the piston 17 may be moved intermittently from one aperture 8 to another, or, if preferred, it may travel continuously. After the piston 17 has traveled to one end of its stroke, it may be returned at a single step to the starting point, or it may travel back slowly, communicating successively for material periods of time with the various apertures 8—8. It will be understood further that if preferred the piston rod 21 may be hollow, whereby backwash connections will be provided at both ends of the casing 1.

According to the present invention the various filter members are readily mounted in operative position whereby to have a fluid-tight connection with the cylinder 4 and the casing 1. They may be readily dismounted for inspection and repairs.

Reciprocations of the piston 17 may be timed or arranged according to any desired schedule. For example, said piston 17 may be controlled according to changes in pressure in the outlet 18, which changes will occur as residue builds up on the filtering members 10. Accordingly, the piston 17 may be moved, by means of any preferred control means, in response to the clogging up of the filtering apparatus.

Though a preferred embodiment of the present invention has been described in detail, many modifications will occur to those skilled in the art. It is intended to cover all such modifications that fall within the scope of the appended claims.

What is claimed is—

1. Filtering apparatus comprising, in combination, a casing, a cylinder mounted therein, a plurality of filtering members communicating with the interior of said cylinder at regions spaced longitudinally of the cylinder, inlet means for material to be filtered communicating with the interior of said cylinder, and a member movable longitudinally of said cylinder, said filtering members providing communication between the interior of said cylinder and the exterior thereof within said casing, said movable member providing communication successively from said filtering members to the exterior of said casing to a region having a lower pressure than the normal pressure within said casing and outside of said filtering members.

2. Filtering apparatus comprising, in combination, a casing, a cylinder therein, said cylinder having a plurality of apertures providing communication between the interior of said cylinder and the exterior thereof within said casing, a plurality of tubular filter members connected with said cylinder and the outer wall of said casing and having their interiors communicating with said apertures, inlet means for material to be filtered communicating with the interior of said cylinder, an outlet for filtered material from said casing, and hollow piston means reciprocably mounted within said cylinder, said hollow piston means being adapted to communicate successively with said apertures and to deliver backwash from the interior of said tubular filter members to the outside of said casing, said cylinder being closed except for said apertures and said inlet means, the pressure within said hollow piston means being less than the pressure outside of said filter members and within said casing.

3. Filtering apparatus comprising, in combination, a casing, a cylinder disposed therein, a plurality of tubular filter members mounted between said cylinder and said casing, said cylinder having a plurality of apertures spaced longitudinally of said cylinder, each providing communication between the interior of said cylinder and the interior of one of said tubular filter members, and a reciprocable member in said cylinder, said reciprocable member being provided with an aperture adapted to communicate successively with the interiors of said tubular filter members to provide connection successively from the interior of said tubular members to a region having a lower pressure than the pressure within said casing outside of said tubular members, said cylinder having an inlet means for entry of material to be filtered and being closed except for said apertures.

4. Filtering apparatus comprising, in combination, a casing, a cylinder disposed therein, a plurality of tubular filter members mounted between said cylinder and said casing, said cylinder having a plurality of apertures spaced longitudinally of said cylinder, each providing communication between the interior of said cylinder and the interior of one of said tubular filter members, said casing being provided with apertures for receiving said tubular filter members and threaded means for closing said apertures and holding the adjacent ends of said filter members, and a reciprocable member in said cylinder, said reciprocable member being provided with an aperture adapted to communicate successively with the interiors of said tubular filter members to provide connection successively from the interior of said tubular members to a region having a lower pressure than the pressure within said casing outside of said tubular members, said cylinder having an inlet means for entry of material to be filtered and being closed except for said apertures.

5. Filtering apparatus comprising, in combination, a casing, a cylinder therein, said cylinder having a plurality of apertures providing communication between the interior of said cylinder and the exterior thereof within said casing, a plurality of tubular filter members connected with said cylinder and the outer wall of said casing and having their interiors communicating with said apertures, inlet means for material to be filtered communicating with the interior of said cylinder at the two ends thereof, an outlet for filtered material from said casing, and hollow piston means reciprocably mounted within said cylinder, said hollow piston means being adapted to communicate successively with said apertures and to deliver backwash from the interior of said tubular filter members to the outside of said casing, said cylinder being closed except for said apertures and said inlet means, the pressure within said hollow piston means being less than the pressure outside of said filter members and within said casing.

6. Filtering apparatus comprising, in combination, a casing, a cylinder disposed therein, a plurality of tubular filter members mounted between said cylinder and said casing, said cylinder having a plurality of apertures spaced longitudinally of said cylinder, each providing communication between the interior of said cylinder and the interior of one of said tubular filter members, means for admitting fluid to be cleaned to the interior of said cylinder, means for drawing off cleaned fluid from said casing, and means movable longitudinally of said cylinder for successively connecting the interiors of said filter members to a region of pressure lower than the pressure outside of said filter members within said casing.

CHARLES W. ANDREWS.